United States Patent
Kutthumolu et al.

(10) Patent No.: US 12,511,163 B2
(45) Date of Patent: Dec. 30, 2025

(54) SYSTEM FOR PREDICTING MEMORY RESOURCES AND SCHEDULING JOBS IN SERVICE-ORIENTED ARCHITECTURES USING DATABASE PROCESSORS AND A JOB INGESTION PROCESSOR

(71) Applicant: BANK OF AMERICA CORPORATION, Charlotte, NC (US)

(72) Inventors: Durga Prasad Kutthumolu, Hyderabad (IN); Sachin S. Nagvekar, Mumbai (IN); Venkata Karthik Ryali, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 933 days.

(21) Appl. No.: 17/686,262

(22) Filed: Mar. 3, 2022

(65) Prior Publication Data
US 2023/0281044 A1    Sep. 7, 2023

(51) Int. Cl.
*G06F 9/50* (2006.01)
*G06F 11/30* (2006.01)
*G06N 20/00* (2019.01)

(52) U.S. Cl.
CPC ........ *G06F 9/5016* (2013.01); *G06F 11/3037* (2013.01); *G06F 11/3075* (2013.01); *G06F 2201/835* (2013.01); *G06N 20/00* (2019.01)

(58) Field of Classification Search
CPC .............. G06F 9/5016; G06F 11/3037; G06F 11/3075; G06F 2201/835; G06F 11/3476; G06N 20/00
See application file for complete search history.

(56) References Cited

U.S. PATENT DOCUMENTS

| | | |
|---|---|---|
| 7,526,508 B2 | 4/2009 | Tan et al. |
| 9,842,000 B2 | 12/2017 | Bishop et al. |
| 9,992,701 B2 | 6/2018 | Egner et al. |
| 10,007,513 B2 | 6/2018 | Malladi et al. |
| 10,304,154 B2 | 5/2019 | Appu et al. |
| 10,310,760 B1 | 6/2019 | Dreier et al. |
| 10,410,115 B2 | 9/2019 | Lewis et al. |
| 10,555,112 B2 | 2/2020 | Williams |
| 10,572,640 B2 | 2/2020 | Yan et al. |
| 10,607,484 B2 | 3/2020 | Yang et al. |
| 10,613,791 B2 | 4/2020 | Meister et al. |

(Continued)

*Primary Examiner* — Kevin L Young

(57) ABSTRACT

A system comprising databases, database processors, a job ingestion processor, and a processor. The databases store job information for previously performed jobs. Each previously performed job comprises timestamp, job name, and amount of memory used information. The database processors detect changes to job information of the previously performed jobs and, in response, communicate the job information associated with the affected jobs to a job ingestion processor. The job ingestion processor parses the job information into timestamp, job name, and amount of memory used variables for each affected job. The parsed job information comprises timestamp values, job name values, and amount of memory used values. The processor stores the job information variables in a data log. The processor uses the job information variables to train a machine learning algorithm and the trained machine learning model to predict amounts of temporary memory needed to execute job requests.

20 Claims, 4 Drawing Sheets

(56) References Cited

U.S. PATENT DOCUMENTS

| | | |
|---|---|---|
| 10,644,940 B2 | 5/2020 | Mladin et al. |
| 10,671,434 B1 | 6/2020 | Gold et al. |
| 10,719,744 B2 | 7/2020 | Smith et al. |
| 10,789,020 B2 | 9/2020 | Karr et al. |
| 10,803,023 B2 | 10/2020 | Ghazaleh |
| 10,833,940 B2 | 11/2020 | Cencini et al. |
| 10,871,966 B2 | 12/2020 | Chen et al. |
| 10,929,749 B2 | 2/2021 | Srinivasa et al. |
| 10,936,238 B2 | 3/2021 | Power et al. |
| 11,017,539 B2 | 5/2021 | Carranza et al. |
| 11,068,389 B2 | 7/2021 | Gao et al. |
| 11,120,299 B2 | 9/2021 | Haigh et al. |
| 11,159,408 B2 | 10/2021 | Svennebring et al. |
| 11,222,392 B2 | 1/2022 | Surti et al. |
| 11,526,491 B1 * | 12/2022 | Mahudeswaran ... G06F 16/2379 |
| 2012/0131584 A1 | 5/2012 | Raevsky |
| 2016/0277200 A1 * | 9/2016 | Asada ................. H04L 12/1822 |
| 2017/0083380 A1 | 3/2017 | Bishop et al. |
| 2018/0176148 A1 * | 6/2018 | Ku ..................... G06Q 30/0283 |
| 2018/0203744 A1 | 7/2018 | Wiesmaier et al. |
| 2018/0241767 A1 | 8/2018 | Crabtree et al. |
| 2018/0285734 A1 | 10/2018 | Chen et al. |
| 2018/0307571 A1 | 10/2018 | Bishop et al. |
| 2019/0132709 A1 | 5/2019 | Graefe et al. |
| 2019/0146481 A1 | 5/2019 | Cella et al. |
| 2019/0205736 A1 | 7/2019 | Bleiweiss et al. |
| 2019/0205737 A1 | 7/2019 | Bleiweiss et al. |
| 2019/0251279 A1 | 8/2019 | Emberson et al. |
| 2019/0340136 A1 | 11/2019 | Irwin et al. |
| 2019/0349254 A1 | 11/2019 | Nolan et al. |
| 2020/0081648 A1 | 3/2020 | Bernat et al. |
| 2020/0103894 A1 | 4/2020 | Cella et al. |
| 2020/0210313 A1 | 7/2020 | Degaonkar et al. |
| 2020/0255026 A1 | 8/2020 | Katardjiev et al. |
| 2020/0327371 A1 | 10/2020 | Sharma et al. |
| 2021/0042140 A1 | 2/2021 | Paul et al. |
| 2021/0073450 A1 | 3/2021 | Boesch et al. |
| 2021/0117384 A1 | 4/2021 | Leite Pinheiro de Paiva et al. |
| 2021/0208546 A1 | 7/2021 | Locke et al. |
| 2021/0320853 A1 | 10/2021 | Kulshreshtha et al. |
| 2021/0350215 A1 | 11/2021 | Lewis et al. |
| 2022/0004926 A1 | 1/2022 | Cella |
| 2022/0206873 A1 * | 6/2022 | He ........................ G06F 9/4881 |
| 2023/0102319 A1 * | 3/2023 | Aher ..................... G06F 3/1275 358/1.15 |
| 2023/0185860 A1 * | 6/2023 | Hibser ................ G06F 12/0802 707/608 |
| 2024/0370267 A1 * | 11/2024 | Cook .................. G06F 15/7867 |

* cited by examiner

| Job triggers Date (Time Stamp) | Job name | Data Processing size (MB/GB/TB) | Job Frequency (Daily/Weekly/Monthly/Quarterly) | Job completion time | Job Processing Time consumption | Predetermined Memory size to process the job request |
|---|---|---|---|---|---|---|
| 20-12-1966 10:00:00 | $Account_Openings | 10 GB | Daily | 20-12-1966 16:00:00 | 1 Hr 15 Min | 5.5 GB |
| 20-12-1966 10:00:01 | $Account_Openings | 11 GB | Daily | 20-12-1966 16:00:01 | 2 Hr 15 Min | 5.5 GB |
| 20-12-1966 10:00:02 | $Account_Openings | 12 GB | Daily | 20-12-1966 16:00:02 | 3 Hr 15 Min | 5.5 GB |
| 20-12-1966 10:00:03 | $Account_Openings | 13 GB | Daily | 20-12-1966 16:00:03 | 4 Hr 15 Min | 5.5 GB |
| 20-12-1966 10:00:04 | $Account_Openings | 14 GB | Daily | 20-12-1966 16:00:04 | 5 Hr 15 Min | 5.5 GB |
| 20-12-1966 10:00:05 | $Archival_Loans | 15 GB | Quarterly | 20-12-1966 16:00:05 | 6 Hr 15 Min | 5.5 GB |
| 20-12-1966 10:00:06 | $Archival_Loans | 16 GB | Quarterly | 20-12-1966 16:00:06 | 7 Hr 15 Min | 5.5 GB |
| 20-12-1966 10:00:07 | $Archival_Loans | 17 GB | Quarterly | 20-12-1966 16:00:07 | 8 Hr 15 Min | 5.5 GB |
| 20-12-1966 10:00:08 | $Archival_Loans | 18 GB | Quarterly | 20-12-1966 16:00:08 | 9 Hr 15 Min | 5.5 GB |
| 20-12-1966 10:00:09 | $Archival_Loans | 19 GB | Quarterly | 20-12-1966 16:00:09 | 10 Hr 15 Min | 5.5 GB |
| 20-12-1966 10:00:10 | $Archival_Loans | 20 GB | Quarterly | 20-12-1966 16:00:10 | 11 Hr 15 Min | 5.5 GB |
| 21-12-1966 10:30:00 | $Payments | 1 GB | Weekly | 22-12-1967 10:30:00 | 2 Hr 20 Min | 2.5 GB |
| 21-12-1967 10:30:01 | $Payments | 2 GB | Weekly | 22-12-1967 10:30:01 | 3 Hr 20 Min | 2.5 GB |
| 21-12-1967 10:30:02 | $Payments | 3 GB | Weekly | 22-12-1967 10:30:02 | 4 Hr 20 Min | 2.5 GB |
| 21-12-1967 10:30:03 | $Payments | 4 GB | Weekly | 22-12-1967 10:30:03 | 5 Hr 20 Min | 2.5 GB |
| 21-12-1967 10:30:04 | $Payments | 5 GB | Weekly | 22-12-1967 10:30:04 | 6 Hr 20 Min | 2.5 GB |
| 21-12-1967 10:30:05 | $Payments | 6 GB | Weekly | 22-12-1967 10:30:05 | 7 Hr 20 Min | 2.5 GB |
| 21-12-1967 10:30:06 | $Payments | 7 GB | Weekly | 22-12-1967 10:30:06 | 8 Hr 20 Min | 2.5 GB |
| 21-12-1967 10:30:07 | $Payments | 8 GB | Weekly | 22-12-1967 10:30:07 | 9 Hr 20 Min | 2.5 GB |

FIG. 2

SYSTEM FOR PREDICTING MEMORY RESOURCES AND SCHEDULING JOBS IN SERVICE-ORIENTED ARCHITECTURES USING DATABASE PROCESSORS AND A JOB INGESTION PROCESSOR

TECHNICAL FIELD

The present disclosure relates generally to service-oriented network architectures and, more specifically, to a system for predicting memory resources and scheduling jobs in service-oriented architectures using database processors and a job ingestion processor.

BACKGROUND

A computer system that processes a large amount of data relies on temporary storage space to store and process the data. The amount of temporary storage space needed may fluctuate from time to time based on the amount of data to be processed at that time. When a sufficient temporary storage space is unavailable to process a given amount of data at a particular point in time, then applications that are used to process that data may halt operation, thereby causing bottlenecks in a network and wasting valuable processing resources.

SUMMARY

The system described in the present disclosure is particularly integrated into a practical application of predicting memory amounts for application process jobs of an application service using, for example, machine learning algorithmic models, historical data, or both, where the amount of data associated with the jobs may increase based on variable factors associated with the application service, and memory system resources using the predicted memory amounts. The system improves underlying computer environments that use scheduling systems to process application process jobs.

In an example scenario, data sets used in the execution of application process jobs may have a typical range in size that can be modeled for and used in establishing a limit to the amount of data that can be processed for a particular application process job. These limits are set to prevent misuse of the system resources and minimize costs. However, variables associated with, for example, the market for an application service, may at times cause the size to increase. Conventional scheduling systems do not have a means to predict the size variability and, therefore, are not equipped to schedule application process jobs and data sets that exceed these limits.

To this end, the disclosed system receives a plurality of job requests, each job request comprises an associated job name and associated job parameters. For a first received job request, the system performs a first comparison of the associated job name and associated job parameters with job information of previously performed jobs. The job information of the previously performed jobs are stored in a database. For the first received job request, the system determines a first amount of memory to perform the first received job request based on the first comparison. For a second received job request, the system performs a second comparison of the associated job name and associated job parameters with job information of each previously performed job. For the second received job request, the system determines a second amount of memory to perform the second received job request based on the second compari-son. For a third received job request, the system perform a third comparison of the job name and job parameters with the job information of each previously performed job. For the third received job request, the system determines a third amount of memory to perform the third received job request based on the third comparison. The system then creates a prioritized queue comprising the first received job request, the second received job request, and the third received job request. The prioritization can be based at least in part upon the first amount of memory, the second amount of memory, and the third amount of memory.

In one embodiment, the system stores a data log and a trained algorithmic model in a database. The data log comprises a plurality of previously performed jobs. Each previously performed job comprises job information identifying a timestamp, a job name, and an amount of memory used.

The system determines the first amount of memory, the second amount of memory, and the third amount of memory using the trained algorithmic model and job parameters of the first received job request, the second received job request, and the third received job request. The system also evaluates the first amount of memory, the second amount of memory, and the third amount of memory with a predetermined memory size associated with the first received job request, the second received job request, and the third received job request.

The system negotiates with at least one service provider and allocation of system resources based on the first amount of memory, the second amount of memory, and the third amount of memory.

The system selects the at least one service provider based on service provider availability. The system prioritizes the first received job request, the second received job request, and the third received job request based on at least one of a service type and size of the first amount of memory, the second amount of memory, and the third amount of memory. The system groups and prioritize the first received job request, the second received job request, and the third received job request based on at least one of a service type and size of the first amount of memory, the second amount of memory, and the third amount of memory.

In some embodiments, application process jobs may be executed by different system resources and stored in a plurality of databases as previously performed jobs. As such, the previously performed jobs may be stored and communicated in different formats. In addition, the plurality of databases may each comprise very large data sets of previously performed jobs. Preparing the previously performed jobs for use by other system components can be resource intensive. In the case of a system that includes system components for scheduling functions for real-time job requests, technical advantages can be realized by separating the processing resources used for prepping the previously performed jobs from processing resources used in scheduling job requests.

In this type of embodiment, the system can detect changes to job information of previously performed jobs stored in a database and parse the previously performed jobs prior to scheduling job requests. The system can parse the previously performed jobs based on application processes and format the previously performed jobs into a format compatible with processing and storing the previously performed jobs in the data log.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 2 illustrates an example of a table comprising job information used in the training of a machine learning algorithm and predicting temporary memory;

DETAILED DESCRIPTION

Figure 1:
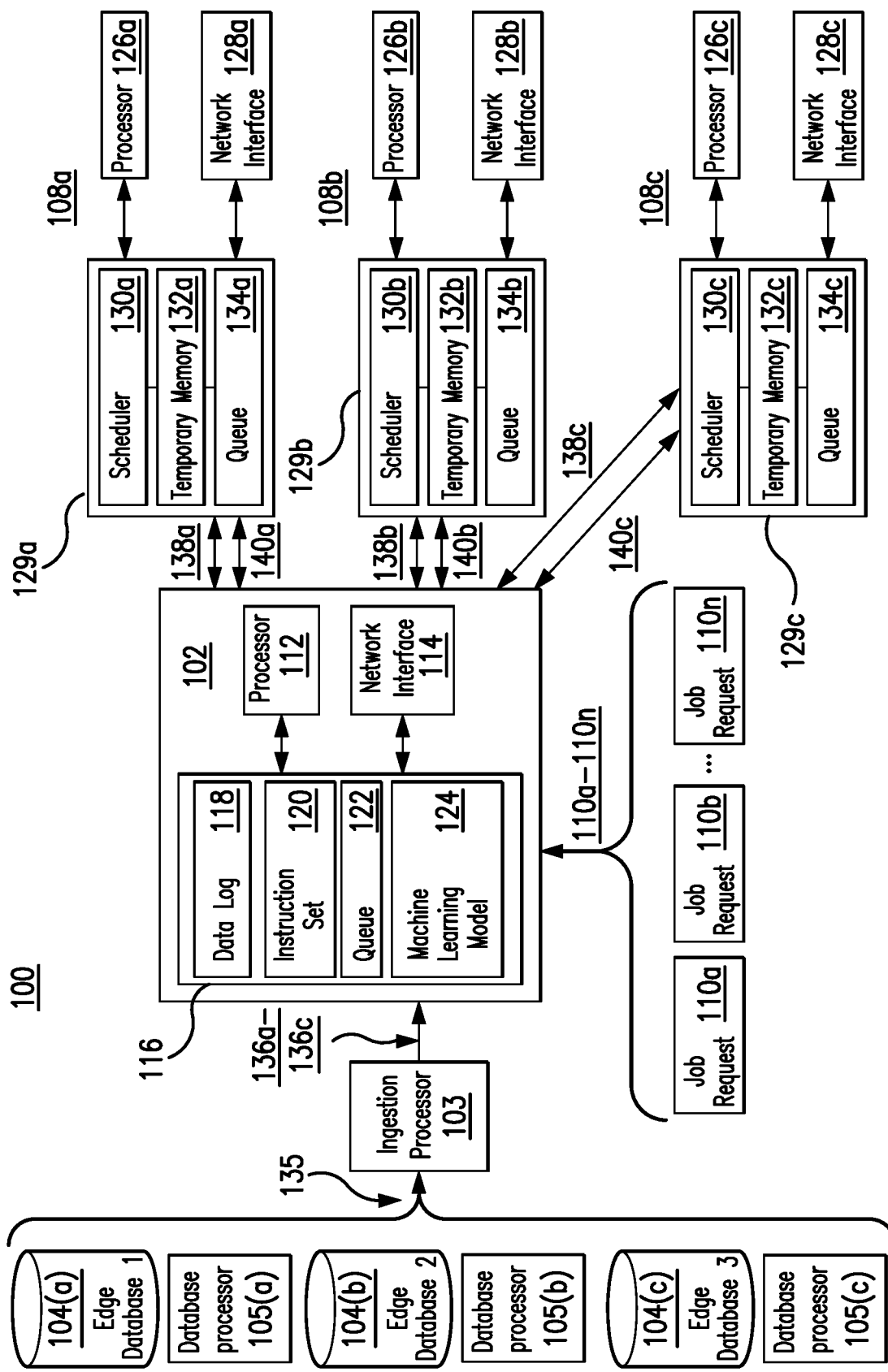
FIG. 1 illustrates an embodiment of a service-oriented architecture and a predictive engine-scheduling negotiator.

Current state of the art system components lack features capable of managing spikes in the amount of data processed by application process tasks (jobs). Presented herein is a service-oriented architecture 100, illustrated in FIG. 1, comprising a predictive engine-scheduling negotiator 102 configured to function as a primary entity, determine or predict temporary memory sizes for application process jobs, and negotiate with one or more secondary entities to schedule the application process jobs for execution using the determined or predicted memory, according to certain example embodiments.

In some embodiments, the service-oriented architecture 100 includes a job ingestion processor 103, database processors 105, or both communicatively coupling databases 104 comprising historical job information data with the predictive engine-scheduling negotiator 102. The job ingestion processor 103, database processors 105, or both are configured to detect changes in the databases 104, parse historical job information data, and communicate the parsed historical job information data to the predictive engine-scheduling negotiator 102.

Figure 3:
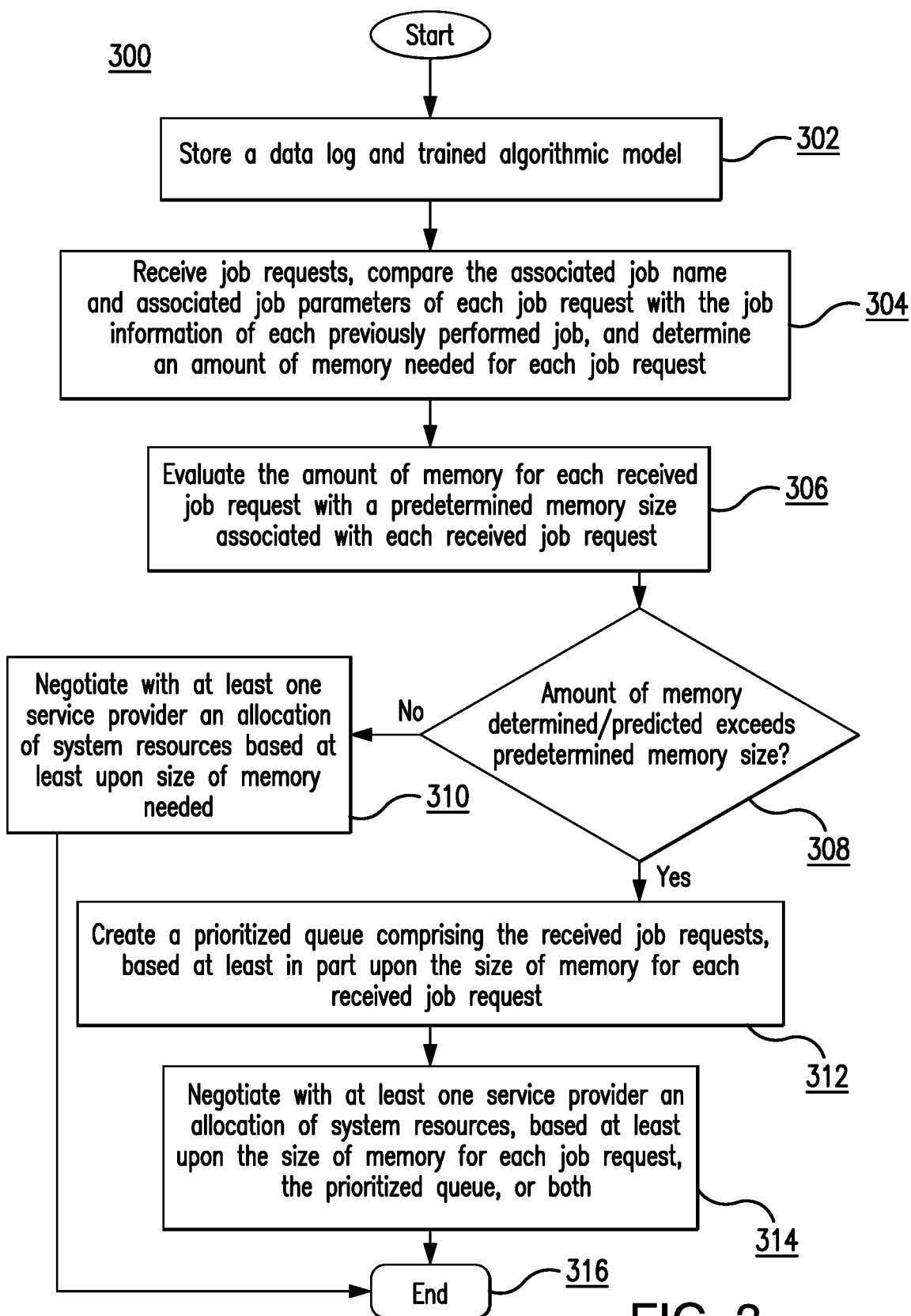
FIG. 3 illustrates an example method for predicting amounts of temporary memory and scheduling applications jobs.
Figure 4:
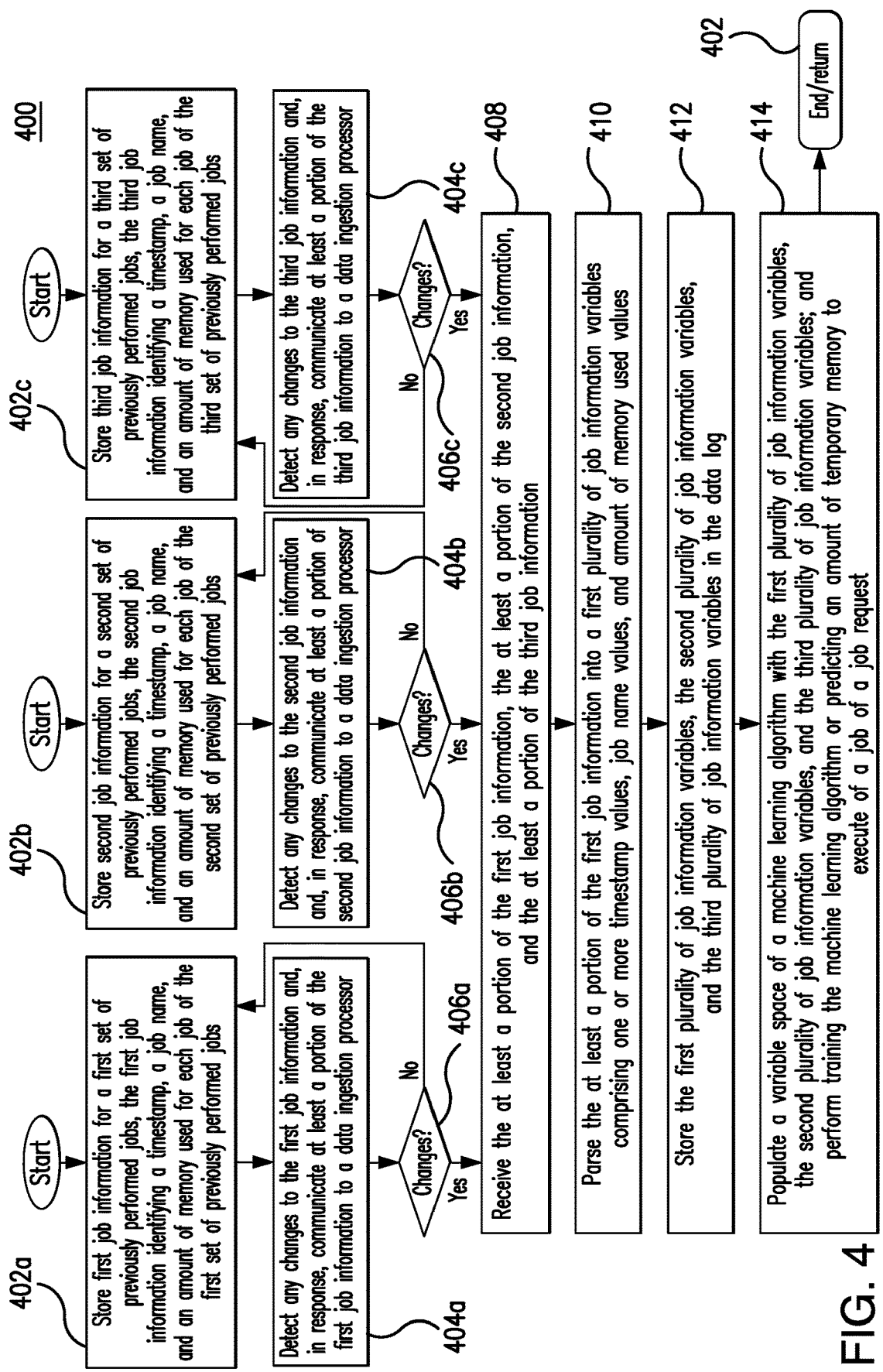
FIG. 4 illustrates an example method for detecting changes to previously performed job requests, parsing the affected previously performed job requests, and efficiently communicating the affected previously performed job requests and the parsed previously performed job requests.

FIG. 2 is an illustration of a job information table 200 comprising job information variables 202-214 and is an example of parameter value pairs associated with jobs, including historical jobs. FIG. 3 is an illustration of a method 300 for how the predictive engine-scheduling negotiator 102 operates, according to certain example embodiments. FIG. 4 is an illustration of a method 400 for how the job ingestion processor 103 and the database processors 105 operate.

The technical advantages of using such system components in a service-oriented architecture 100 includes fewer service interruptions and a reduction in processing and communications latency.

Example System for Implementing a Predictive Engine-Scheduling Negotiator Used in a Service-Oriented Network Computing Architecture Referring to FIG. 1, the service-oriented architecture 100 comprises the predictive engine-scheduling negotiator 102, databases 104a, 104b, and 104c, service provider networks 108a, 108b, and 108c, and job requests 110a-110n. The predictive engine-scheduling negotiator 102 can be associated with a primary entity and the service provider networks 108 can be associated with secondary entities. The predictive engine-scheduling negotiator 102 and the service provider networks 108 work together in the execution of the job requests 110. In some embodiments, the databases 104a-104c may be edge databases and the service-oriented architecture 100 may also comprise the job ingestion processor 103, database processors 105a-105c, or both.

The predictive engine-scheduling negotiator 102 comprises a processor 112, a network interface 114, and a memory 116. The memory 116 is configured to store a data log 118, instruction set 120, queue 122, and a trained machine learning model 124. The service provider networks 108 comprise processors 126a-126c, network interfaces 128a-128c, and memories 129a-129c. The memories 129a-129c are configured to store schedulers 130a-130c, temporary memories 132a-132c, and queues 134a-134c. Databases 104a-c are configured to store previously performed jobs 136.

The processor 112 implements the data log 118, queue 122, the trained machine learning model 124, decodes previously performed jobs 136, encodes one or more process related messages 138a-138c, and decodes one or more process related messages 140a-140c by executing instructions from the instruction set 120. The processors 126 implement the schedulers 130, temporary memories 132, and the queues 134, and decodes one or more process related messages 138, and encodes one or more process related messages 140. The network interface 114 implements one or more communication protocol stacks for receiving previously performed jobs 136 from databases 104, receiving job requests 110, sending process related messages 138, and receiving process related messages 140. The network interfaces 128 implement one or more communication protocol stacks for receiving process related messages 138 and sending process related messages 140.

The process related messages 138, 140 can be communication messages that include headers that identify sending and receiving entity addresses and bodies that include messages specific to the scheduling process. As an example, a message 138a-138c can be a request, e.g. to allocate an amount of memory or a request to deallocate an amount of memory, or any other message relevant to the process described herein. A message 140a-140c can be a response to a request, e.g. a granting or denial of a request to allocate an amount of memory, or any other message relevant to the process described herein. A message 138a-138c can be an inquiry, e.g. regarding service availability, or any other message relevant to the process described herein. A message 140a-140c can be a response to an inquiry, e.g. service availability, or any other message relevant to the processes described herein.

Job information variables 202-214 of previously performed jobs 136 are ingested into the data log 118 and the processor 112 uses job information variables 202-214 from the previously performed jobs 136 to train a machine learning algorithm. As an example, the processor 112 can ingest an archive (e.g. batch data for previous three years) of previously performed jobs 136 and store the jobs 136 in the data log 118 for training a machine learning algorithm. Once a machine learning algorithm has been trained, the processor 112 implements the trained machine learning model 124 and stores the same in memory 116.

The processor 112 can be initiated, e.g., by a trigger event. A trigger event can be execution of an application or receiving job requests 110. Job requests 110 are generated by applications and received through network interface 114 for further processing by the processor 112. The job requests 110 and previously performed jobs 136 comprise job information variables 202-214. Job information variables 202-214 comprise variables with each variable having a parameter and one or more values.

The table 200 in FIG. 2 lists example job information variables 202-214. Job information variables 202-214 can include the following parameters: a job triggered date time stamp 202, job name 204, data processing size 206, job frequency (daily, weekly, monthly, and quarterly) 208, job completion time 210, job processing time consumption 212, and predetermined memory size to process the job request 214 (or simply predetermined memory size 214).

The processor 112 can then use job information variables 202-214 of the job requests 110, job information variables 202-214 of previously performed jobs 136 (or a subset thereof), the trained machine learning model 124, or any combination thereof, to predict an amount of memory from temporary memory 132 for each job request 110a-110n. The processor 112 can evaluate the predicted amount memory against a predetermined memory size associated with each job request 110a-110n.

The processor 112 can then send a process related message 138 to negotiate an amount of memory predicted for each job request 110a-110n that exceeds the predetermined memory size for the respective job request 110a-110n. The processor 112 can then prioritize the job requests 110, create the queue 122, and populate the queue 122 with the job requests 110. The job requests 110 can be prioritized, e.g., based on the amount of memory predicted for each job request 110a-110n.

The prioritized job requests 110 in the queue 122 can then be sent to one or more of the schedulers 130 using one or more of the process related messages 138. The one or more schedulers 130 can then populate one or more of the queues 134 with jobs associated with the prioritized job requests 110.

In some embodiments, the databases 104a-104c can be installed on and executed from the database processors 105a-105c. The database processors 105 can be configured to detect changes in the databases 104 and send previously performed jobs 135 to the job ingestion processor 103 or the processor 112.

The job ingestion processor 103 or the processor 112 can be configured to parse job information variables 202-214 from the previously performed jobs 135 based on application processes and job information variables. The job ingestion processor 103 or the processor 112 can store the parsed, previously performed jobs 136 in the data log 118.

It should be understood, previously performed jobs 135 communicated to the job ingestion processor 103 comprise job information variables 202-214 sourced from different service provider networks 108 and, as such, can be in incompatible protocol formats and disorganized with respect to their application processes and, therefore, their dependencies. The previously performed jobs 135 should therefore be organized before determining or predicting the amount of temporary memory 132, creating and prioritizing the queue 122, and scheduling the job requests 110 for execution. The advantage of doing so results in improved processing time.

The database processors 105, the job ingestion processor 103, the processor 112, or any combination thereof can be lightweight, efficient devices configured to perform this functionality. For example, the database processors 105 can be configured to perform database operations and supporting operations. An advantage of such a configuration is an improvement in processing and communications efficiency and, therefore, a reduction in latency.

System Components

Predictive Engine-Scheduling Negotiator

Predictive engine-scheduling negotiator 102 is a device that is configured to process data and communicate with computing devices, databases, systems, etc., via one or more networks. The predictive engine-scheduling negotiator 102 is generally configured to predict amounts of temporary memories 132 for jobs of application processes and negotiate with schedulers 130 of service provider networks 108 to configure temporary memories 132a-132c based on the predicted amounts of memory. This operation is described further below in conjunction with the section entitled "Operational Flow" and the method 300 described in FIG. 3.

The processor 112 is in signal communication with the network interface 114 and the memory 116. Memory 116 is configured to store software instruction set 120 that when executed by the processor 112, cause the processor 112 to perform one or more functions described herein. For example, when the software instruction set 120 is executed, the processor 112 can receive job requests 110, predict amounts of memory needed to execute the job requests 110, and negotiate with schedulers 130 of service provider networks 108 to configure temporary memories 132 based on the predicted amounts of memory. The predictive engine-scheduling negotiator 102 may be configured as shown, or in any other configuration.

Processor 112 comprises any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processor 112 may be a programmable logic device, a microcontroller, a microprocessor, or any suitable combination of the preceding. The processor 112 is communicatively coupled to and in signal communication with the network interface 114 and memory 116. The one or more processors are configured to process data and may be implemented in hardware or software. For example, the processor 112 may be 8-bit, 16-bit, 32-bit, 64-bit, or of any other suitable architecture. The processor 112 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute software instruction set 120 to implement the functions disclosed herein, such as some or all of those described with respect to FIGS. 1-3. In some embodiments, the function described herein is implemented using logic units, FPGAs, ASICs, DSPs, or any other suitable hardware or electronic circuitry.

The network interface 114 is configured to enable wired and/or wireless communications. The network interface 114 is configured to communicate data between the memory 116 and other network devices, systems, or domain(s). For example, the network interface 114 may comprise a WIFI interface, a local area network (LAN) interface, a wide area network (WAN) interface, a modem, a switch, or a router. The processor 112 is configured to send and receive data using the network interface 114 and memory 116. The network interface 114 may be configured to use any suitable type of communication protocol.

Memory 116 may be volatile or non-volatile and may comprise a read-only memory (ROM), random-access memory (RAM), ternary content-addressable memory (TCAM), dynamic random-access memory (DRAM), and static random-access memory (SRAM). Memory 116 may be implemented using one or more disks, tape drives, solid-state drives, and/or the like. Memory 116 is operable to store the data log 118, the software instruction set 120, queue 122, and trained machine learning model 124, and/or any other data or instructions. The software instruction set 120 may comprise any suitable set of instructions, logic, rules, or code operable to execute the processor 112.

Jobs Ingestion Processor

The job ingestion processor 103 is a device that is configured to process data and communicate with computing devices, databases, systems, etc., via one or more networks. The job ingestion processor 103 is generally configured to receive previously performed jobs 135 from database processors 106 and stream parsed, previously performed jobs 136 in real time to the processor 112. This operation is described further below in conjunction with the method 400 described in FIG. 4. The job ingestion processor 103 is in signal communication with the database processors 105 and processor 112. The job ingestion processor 103 may be configured as shown, or in any other configuration.

The job ingestion processor 103 comprises any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The job ingestion processor 103 may be a programmable logic device, a microcontroller, a microprocessor, or any suitable combination of the preceding. The job ingestion processor 103 is communicatively coupled to and in signal communication with the database processors 105 and processor 112. The job ingestion processor 103 may be implemented in hardware or software. For example, the job ingestion processor 103 may be 8-bit, 16-bit, 32-bit, 64-bit, or of any other suitable architecture. The job ingestion processor 103 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The job ingestion processor 103 is configured to implement various instructions to implement the functions disclosed herein, such as some or all of those described with respect to FIGS. 1 and 4. In some embodiments, the function described herein is implemented using logic units, FPGAs, ASICs, DSPs, or any other suitable hardware or electronic circuitry.

Data Log, Instruction Set, Queue, and Machine Learning Model

The data log 118 comprises job information variables 202-214 relating to the execution of previously performed jobs 136. Job information variables 202-214 comprise parameters and respective values that can be used as tags to create a training and validation data set for training a machine learning algorithm. The job information variables 202-214 are generated during the instantiation and execution of application process jobs and provide state information about application process jobs during instantiation and execution.

The table 200 in FIG. 2 is an example of job information variables 202-214. The job information variables 202-214 can include parameters $202_{a0}$-$214_{a0}$ and their associated values (row entries) $202_{a1}$-$202_{a(number\ of\ rows)}$-$214_{a1}$-$214_{a(number\ of\ rows)}$). Job information variables 202-214 comprise the following parameters: job triggered date time stamp $202_{a0}$, job name $204_{a0}$, data processing size $206_{a0}$, job frequency (daily, weekly, monthly, and quarterly) $208_{a0}$, job completion time $210_{a0}$, job processing time $212_{a0}$, predetermined memory size $214_{a0}$ and their associated values $202_{a1}$-$202_{a(number\ of\ rows)}$-$214_{a1}$-$214_{a(number\ of\ rows)}$). The data processing size variable 206 is an actual amount of data processed during the instantiation and execution of an associated application process job. The job processing time consumption, or simply job processing time, $212_{a0}$ is the amount of time needed to execute a job.

The data log 118 may be stored in memory, swap space, a combination thereof and implemented in a standalone computer environment, a distributed computing environment, a clustered computing environment, or any combination thereof, in the form of a database or a flat file. The instruction set 120 comprises instructions in the form of computer readable variables and functions that can be implemented in hardware, software, or combinations thereof. When executed, the instruction set 120 causes the processor 112 to implement the data log, queue 122, and trained machine learning model 124 for the purpose of performing the operations described herein.

The queue 122 is storage space in memory 116 that can be used to store prioritize job requests 110. The queue 122 is used by the processor 112 to correlate process related messages 138 with job requests 110.

The trained machine learning model 124 is an algorithmic model that comprises a parameter space that is constructed, trained, and validated based, at least, on job information variables 202-214 from previously performed jobs 136 and a set of input and output variables to accommodate job information variables 202-214 from one or more job requests 110a-110n. When executed by the processor 112, the trained machine learning model 124 predicts an amount of memory from temporary memory 132 needed to execute the one or more job requests 110a-110n. The trained machine learning model 124 is particularly useful in Big Data applications.

Databases

Databases 104 are generally devices that can be configured to store data, such as job information variables 202-214 for previously performed jobs 136. The databases 104a-104c can be relational type database, or any other type of database type capable of efficiently processing large amounts of data, configured to receive data, store data, and send data through network interfaces of the service-oriented architecture 100 using appropriate protocols. The databases 104a-104c can be edge devices that can be part of a primary entity's or secondary entity's computer architecture.

Database Processors

The database processors 105 are devices that are configured to process data and communicate with computing devices, databases, systems, etc., via one or more networks. The database processors 105 are generally configured to receive previously performed jobs 135 from the databases 104 and stream the previously performed jobs 135 in real time to the job ingestion processor 103 or the processor 112. This operation is described further below in conjunction with the method 400 described in FIG. 4. The database processors 105 are in signal communication with the job ingestion processor 103 or processor 112. The database processors 105 may be configured as shown, or in any other configuration.

The database processors 105 comprise any electronic circuitry, including, but not limited to, state machines, one or more central processing unit (CPU) chips, logic units, cores (e.g., a multi-core processor), field-programmable gate arrays (FPGAs), application-specific integrated circuits (ASICs), digital signal processors (DSPs), or Internet of Things (JOT) processors. The database processors 105 may be a programmable logic device, a microcontroller, a microprocessor, or any suitable combination of the preceding. The database processors 105 are communicatively coupled to and in signal communication with the job ingestion processor 103 or processor 112.

The database processors 105 may be implemented in hardware or software. For example, the database processors 105 may be 8-bit, 16-bit, 32-bit, 64-bit, or of any other suitable architecture. The database processors 105 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The database processors 105 are configured to implement various instructions to implement the functions disclosed herein, such as some or all of those described with respect to FIGS. 1 and 4. In some embodiments, the function described herein is implemented using logic units, FPGAs, ASICs, DSPs, or any other suitable hardware or electronic circuitry.

Job Requests

Job requests 110a-110n comprise application jobs that perform an application function when instantiated and executed. The application jobs comprise job information variables 202-214 and generate job information variables 202-214 when instantiated and executed.

Job Information Variables

Job information variables 202-214 refer to parameters and values associated with application jobs, previously performed jobs 136 in the data log 118, previously performed jobs 136, job requests 110a-110n. The job information variables 202-214 in the job information table 200 of FIG. 2 is an example of job information that is associated with previously performed jobs 136 and jobs associated with job requests 110 but is not exhaustive. In general, job information variables 202-214 are metadata that describe parts of an application job. The metadata describes input and output variables and functions of an application job and any variables associated with the instantiation and execution of an application job.

The variables 202-214 include parameters job triggered date time stamp $202_{a0}$, job name $204_{a0}$, data processing size $206_{a0}$, job frequency (daily, weekly, monthly, and quarterly) $208_{a0}$, job completion time $210_{a0}$, job processing time consumption $212_{a0}$, predetermined memory size $214_{a0}$, and associated values (row values) $202_{a1}$-$202_{a(number\ of\ rows)}$-$214_{a1}$-$214_{a(number\ of\ rows)}$. As such, a variable used herein is expressed, e.g., as ($202_{a(column\ number)}$, $202_{a(row\ number)}$). The data processing size variable 206 is an actual amount of data processed during the instantiation and execution of an associated application process job.

Service Provider Networks

Service provider networks 108 include networks used in the communication of data in the service-oriented architecture 100. The networks 108 may be any suitable type of wireless and/or wired network, including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The service provider networks 108 may be configured to support any suitable type of communication protocol as would be appreciated by one of ordinary skill in the art.

Service provider networks 108 provide access to computer infrastructure and data storage and processing support (application and networking processing support) services, such as schedulers 130 and temporary memories 132. The predictive engine-scheduling negotiator 102 and the service provider networks 108 work together in scheduling and executing job requests 110a-110n. The infrastructure of the service provider networks 108 can be standalone computer architecture, a distributed computing environment, a clustered computing environment, or any combination thereof.

Service Provider Processors, Schedulers, and Memory

Processors 126 comprise any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The processors 126 may be a programmable logic device, a microcontroller, a microprocessor, or any suitable combination of the preceding. The processors 126 are communicatively coupled to and in signal communication with the network interfaces 128 and the memories 129. The one or more processors 126 are configured to process data and may be implemented in hardware or software. For example, the processors 126 may be 8-bit, 16-bit, 32-bit, 64-bit, or of any other suitable architecture. The processors 126 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. In some embodiments, the function described herein is implemented using logic units, FPGAs, ASICs, DSPs, or any other suitable hardware or electronic circuitry.

The schedulers 130a-130c are implemented by corresponding processors 126a-126c, configured to receive messages 138a-138c from the predictive engine-scheduling negotiator 102 and based on the received messages 138a-138c allocate amounts of memory from one or more of the temporary memories 132a-132c. The schedulers 130 are also configured to send messages 140a-140c to the predictive engine-scheduling negotiator 102 if the amount of memory requested is not available. The schedulers 130 are also configured to receive messages 138a-138c from the predictive engine-scheduling negotiator 102 requesting deallocation of an amount of temporary memory from memories 132a-132c. The schedulers 130 and temporary memories 132 can be part of a standalone computer architecture, a distributed computing environment, a clustered computing environment, or any combination thereof and maintained by the supplemental entities.

The temporary memories 132 may be volatile or non-volatile and may comprise a read-only memory (ROM), random-access memory (RAM), ternary content-addressable memory (TCAM), dynamic random-access memory (DRAM), and static random-access memory (SRAM). Temporary memories 132 may be implemented using one or more disks, tape drives, solid-state drives, and/or the like. Temporary memories 132 are operable to store jobs of the job requests 110.

Process Related Messages

The process related messages 138, 140 can be communication messages that include headers that identify sending and receiving network addresses and bodies that include messages specific to states of scheduling process. As an example, a message 138a-138c can be a request, e.g. to allocate an amount of memory or a request to deallocate an amount of memory, or any other message relevant to the process described herein. A message 140a-140c can be a response to a request, e.g. a denial of a request to allocate an amount of memory, or any other message relevant to the process described herein. A message 138a-138c can be an inquiry, e.g. regarding service availability, or any other message relevant to the process described herein. A message 140a-140c can be a response to an inquiry, e.g. service availability, or any other message relevant to the processes described herein.

Operational Flow

In a practical application, the service-oriented architecture 100 includes the predictive engine-scheduling negotiator 102 that functions as a primary entity responsible for providing application services and associated job requests 110 and the service provider networks 108 that function as secondary entities responsible for providing supporting services in the form of the processors 126, schedulers 130, and temporary memories 132 that are used in executing jobs associated with job requests 110.

The amount of temporary memories 132a-132c used in executing jobs is bound by a predetermined memory size for each job executed. The predetermined memory size can be based on a typical amount of temporary memory needed to execute the job. The primary entity provides application services and the secondary entities support application services using these predetermined memory sizes. However, variables relating to a particular application service may be affected by a market for the application service and, as such, the amount of temporary memory typically needed may not always be sufficient. Attempting to execute a job without sufficient memory can result in a disruption of service or a delay in rendering a service. Either of which reduces the efficiency of system resources and quality of the application service.

In an example use case, the data log 118 comprises job information variables 202-214 from previously performed jobs 136 of previously performed application processes for application services. The processor 112 receives job requests 110a-110n for one or more application processes and evaluates the job information variables 202-214 (or subsets thereof) of the job requests 110 against job information variables 202-214 for the previously performed jobs 136 in the data log 118.

If job request 110b, job request 110e, and job request 110f comprise job triggered date time stamp 202, job name 204, and job frequency 208 variables, the processor 112 can determine the predetermined memory size for each job request 110b, 110e, and 110f and compare the information against the job information variables 202-214 for the previously performed jobs 136 in the data log 118 to identify relevant job triggered date time stamp 202, job name 204, job frequency 208, and the predetermined temporary memory size 214 variables. In some embodiments, the predetermined memory size for the job requests 110b, 110, and 110f may be pre-stored in memory 116 independent from the job requests 110 or may be a variable of the job requests 110. The processor 112 can then compare the data processing size 206 variables of the relevant variables of the relevant previously performed jobs 136 in the data log 118 with the predetermined memory sizes of the job requests 110b, 110e, and 110f to determine or predict an amount of memory from temporary memories 132 needed to execute each job associated with the job requests 110b, 110e, and 110f.

As an example, if the job triggered date time stamp parameter $202_{a0}$, job name parameter $204_{a0}$, job frequency parameter $208_{a0}$, and the predetermined memory size parameter $214_{a0}$ for the job requests 110b, 110e, and 110f have values for the job request 110b of: "20-12-2021 09:45:27," "$Account Openings," "Daily," and "5.5 GB;" the job request 110e of: "20-12-2021 10:05:21," "$Archival Loans," "Quarterly," and "5.5 GB;" and for the job request 110f of: "20-12-2021 09:39:40," "$Payments," "Monthly," and 2.5 GB, the processor 112 can compare these job information variables (202, 204, 208, and 216) with the same job information variables (202, 204, 208, and 216) of the previously performed jobs 136 in the data log 118 to identify relevant previously performed jobs 136 in the data log 118.

The processor 112 can use the results of the comparison to determine or predict if the predetermined memory sizes set for the job requests 110b, 110e, and 110f are sufficient when considering the data processing size 206 variables for the relevant previously performed jobs 136. If the data processing size 206 variables of the relevant previously performed jobs 136 have values exceeding the predetermined memory sizes set for the job requests 110b, 110e, and 110f, the processor 112 can set a new value and negotiate with the service provider networks 108.

More specifically, and using the variables 202-214 in table 200 as an example, the processor 112 can determine that the job information variables (202, 204, 208, and 214) for the job requests 110b, 110e, and 110f are the same as or similar to the job information variables ($202_{a2}$, $204_{a2}$, $208_{a2}$, $214_{a2}$), ($202_{a8}$, $204_{a8}$, $208_{a8}$, $214_{a8}$), and ($202_{a13}$, $204_{a13}$, $208_{a13}$, $214_{a13}$), see table 200 in FIG. 2, for the previously performed jobs 136a, 136b, and 136c. In this particular example, the processor 112 can identify the previously performed job 136a as relevant to the job request 110b considering that the date variable 202, job name 204, job frequency 208, and predetermined memory size 214 variables are similar or the same.

The processor 112 can then determine that the job request 110b has a predetermined memory size of 5.5 GB but the data processing size variable 206 for the previously performed job 136a has a size of 11 GB. With respect to the job request 110e, the processor 112 can determine that the job request 110e has a predetermined memory size of 5.5 GB but the data processing size variable 206 for the previously performed job 136b has a size of 17 GB. In either case, the processor 112 determines that the predetermined memory size of 5.5 GB for the job requests 110b and 110e is not likely to be sufficient to process the jobs associated with the job requests 110b and 110e, considering the data processing size values associated with the variables 206 for the previously performed jobs 136a and 136b. With respect to the job request 110f, the processor 112 can determine that the predetermined memory size of 2.5 GB for the job request 110f is sufficient considering that the data processing size variable 206 of the previously performed job 136c has a size of 2.0 GB.

As previously stated, data associated with jobs can be generally consistent but may experience fluctuations during one or more periods of a cycle, e.g. during the holidays or significant events, such as those that can affect the price of a stock. In these cases, the date time stamp variable 202 can be a good index from which to further filter the previously performed jobs 136. However, in other instances, the parameters, values, or any combination thereof of the job name variable 204, the data processing size variable 206, the job frequency variable 208, job processing time variable 212, the predetermined memory size variable 214, or any combination thereof of the previously performed jobs 136 can be used to create an index.

In this case, the processor 112 can compare the job name variables 204, the predetermined memory size variables 214, or both of the job requests 110 against the same variables in the data log 118 to create an index of relevant previously performed jobs 136, filter the index based on job frequency variables 208, job processing time variables 212, or both, and schedule the job requests 110 based on the filtered results. For example, the processor 112 can create an index of the job information variables (204, 208, 214) of previously performed jobs 136 having a job name parameter 204 of "$Payments" and filter the index based on anomalies found between the job frequency variables 208, the job processing time variables 212, or both. If a particular job processing time value shows a significant increase in processing time for a set of processing time variables 212, the processor 112 can negotiate for additional memory or change the priority level for the associated job request 110.

It should be understood that the data log 118 may comprise millions of rows, columns, or both of variables that can require significant processing resources. As such, extrapolating between job information variables 202-214 for previously performed jobs 136 in the data log 118 and job information variables 202-214 for job requests 110 to determine amounts of temporary memory needed in scheduling jobs in the service-oriented architecture 100 may be difficult. As such, the trained machine learning model 124 can be used to predict amounts of memory in these situations.

The processor 112 generates one or more process related messages 138 and encodes the one or more messages 138 with address information of one or more service provider networks 108 and a message to negotiate for temporary memory 132 based on the determined or predicted amount or amounts of memory for each job request 110b, 110e, and 110f that the processor 112 determined the predetermined memory size was insufficient. For example, in the case of the job request 110b, the processor 112 can send the message 138 to each service provider network 108a-108c with a request for service availability and an amount of memory needed. If, for example, service provider networks 108b-108c reply with process related messages 140 denying the request, e.g. due to the lack of available resources, the processor 112 can schedule the job request 110b accordingly. Additionally, the service provider networks 108 can reply with process related messages 140 indicating service load and capacity.

The processor 112 can then create a prioritized queue 122 comprising the job request 110b, the job request 110e, the job request 110f, and other job requests. The priority of the queue 122 can be based at least in part upon the service load, capacity, size of the amount of memory for job request 110b, the amount of memory for job request 110e, the amount of memory for job request 110f, the type of job, processing time (job processing time variable 212), etc.

Continuing the previous example, if the determined or predicted amount of memory of job request 110b is 11 GB, job request 110e is 17 GB, and job request 110f is 2.5 GB, the processor 112 can prioritize the job requests 110b, 110e, and 110f based on the amount of memory with job request 110b taking priority over job requests 110e and 110f or job requests 110e and 110f taking priority over job request 110b. Alternatively, if job request 110b, 110e, and 110f have differing job types, the processor 112 can prioritize the job requests 110b, 110e, and 110f based on the job type, based on the job type and the job processing time variable 212, or based on the job type, determined or predicted amount of temporary memory, and the job processing time variable 212 using the determined or predicted amount of temporary memory, the job information variables for the relevant previously performed jobs 136, or both.

The job requests 110 can also be grouped based on load, capacity, amount of memory, job type, priority, etc. and placed in queue 122 according to group. In addition, groups themselves can be prioritized based on the priority of load, capacity, amount of memory, job type, and priority, e.g. using different levels of priority.

The processor 112 can generate one or more messages 138, address the one or more messages 138 with one or more addresses of the service provider networks 108, encode one or more bodies of the one or messages 138 with a request to negotiate for predetermined amounts, determined or predicted amounts, or both of temporary memory 132 based at least upon the size of memory for each job request, the prioritized queue, or both. The processor 112 can then send the job requests 110 in the queue 122 to the service provider networks 108 using the process related messages 138.

Example Method for Predicting Amounts of Temporary Memory and Scheduling Application Jobs FIG. 3 illustrates an example flowchart of a method 300 for predicting amounts of temporary memories 132 and scheduling job requests 110. The method 300 begins when the processor 112 is initiated, e.g., by a trigger event such as receiving job requests 110. At block 302, the processor 112 implements the data log 118 and the trained machine learning model 124 and stores the same in memory 116.

At block 304, the processor 112 receives job requests 110 and compares job information variables 202-214 (or a subset of the variables 202-214) of the job requests 110 with job information variables 202-214 of previously performed jobs 136 stored in the data log 118 to identify a relevant subset of the previously performed jobs 136.

The processor 112 can then determine therefrom an amount of memory from the temporary memory 132 needed for each job request 110. In some embodiments, the processor 112 can use job information variables 202-214 of each of the job requests 110, job information variables 202-214 of a relevant subset of the previously performed jobs 136, or both to populate a variable space of the trained machine learning model 124. The processor 112 can then execute the trained machine learning model 124 to predict an amount of temporary memory 132 needed to execute each of the job requests 110.

At block 306, the processor 112 evaluates the determined or predicted amount of memory from temporary memory 132 against a predetermined memory size associated with each job request 110. At block 308, the processor 112 determines if one or more amounts of temporary memories 132 exceeds one or more of the predetermined memory sizes, or both. For each determined amount that exceeds the respective predetermined memory size, the processor 112 continues to block 310 where the processor 112 generates one or more messages 138, addresses the one or more messages 138 with one or more addresses of the service provider networks 108, encodes one or more bodies of the one or messages 138 with a request to negotiate for the determined or predicted amount or amounts of temporary memories 132. The processor 112 continues to block 316 after the processor 112 completes negotiating with the service provider networks 108 where the method 300 terminates or returns to monitoring for job requests.

At block 312, the processor 112 prioritizes the job requests 110 that have a predicted or determined amount of temporary memory that does not exceed the predetermined amount of temporary memory. At block 314, the processor 112 generates one or more messages 138, addresses the one or more messages 138 with one or more addresses of the service provider networks 108, encodes one or more bodies of the one or messages 138 with a request to negotiate for predetermined amounts, determined or predicted amounts, or both of temporary memory 132 based at least upon the size of memory for each job request, the prioritized queue, or both. At block 316, the processor 112 terminates by either being shut down or returning to monitoring for job requests 110.

Example Method for Using Database Processors, a Job Ingestion Processor, and a Processor, or any Combination Thereof, to Process and Communicate Job Information for Training Machine Learning Algorithms, Determining Amounts of Temporary Memory, and Scheduling Jobs FIG. 4 illustrates an example flowchart of a method 400 for storing previously performed jobs in the databases 104, detecting changes to the previously performed jobs stored in the databases 104, communicating changed, previously performed jobs 135 to a job ingestion processor 103, parsing the changed, previously performed jobs 135, communicating parsed, previously performed jobs 135 to processor 112, and using parsed, previously performed jobs 136 to determine or predict an amount of temporary memory 132 needed to execute jobs associated with job requests 110. As previously stated, previously performed jobs and job requests comprise, have associated therewith, or both job information variables 202-214.

The method 400 begins when the database processors 105 are initiated or activated by receiving previously performed jobs. At blocks 402a-402c, the database processors 105 store first, second, and third job information variables 202-214 for a first set, a second set, and a third set of previously performed job 136 in a respective database 104.

The first, second, and third job information variables 202-214 comprise the following job information parameters: job triggered date (time stamp) $202_a$, job name $204_a$, data processing size $206_a$, job frequency (e.g., daily weekly monthly quarterly) $208_a$, job completion time $210_a$, job processing time $212_a$, predetermined temporary memory size $214_a$, and associated values (row entries) $202_{a1}$-$202_{a(number\ of\ rows)}$-$214_{a1}$-$214_{a(number\ of\ rows)}$), or subsets thereof. The job information variables 202-214 are associated with an application process of an application service.

At blocks 404a-404c and 406a-406c, the database processors 105a-105c detect any changes to the first, second, and third job information variables 202-214 for the respective previously performed jobs. If there are no changes, the database processors 105a-105c return to blocks 402a-402c, respectively. If there are changes, the database processors 105a-105c communicate at least a portion of the first, second, and third job information variables 202-214 of the previously performed jobs 135 to the job ingestion processor 103. The database processors 105 can then return to blocks 402a-402c after communications are complete.

At block 408, the job ingestion processor 103 receives the at least a portion of the first job information variables 202-214, the at least a portion of the second job information variables 202-214, and the at least a portion of the third job information variables 202-214.

At block 410, the job ingestion processor 103 parses the at least a portion of the first, second, and third job information variables 202-214 into a first plurality, second plurality, and third plurality of parsed, job information variables 202-214. The first plurality, second plurality, and third plurality of parsed, job information variables 202-214 can, e.g., comprise one or more timestamp values, job name values, and amount of memory used values. The job ingestion processor 103 then communicates the parsed, job information variables 202-214 comprising one or more timestamp values, job name values, and amount of memory used values to the processor 112.

The job information variables 202-214 can be parsed based on protocol formats for communicating or storing data, for example a standardized transmission protocol or database format, application processes, application job types, or any combination thereof.

At block 412, the processor 112 stores the first plurality of job information variables 202-214, the second plurality of job information variables 202-214, and the third plurality of job information variables 202-214 in the data log 118.

At block 414, the processor 112 populates a variable space of a machine learning algorithm or trained machine learning model 124 with the first, second, and third plurality of job information variables 202-214. The processor 112 can then train a machine learning algorithm using a training and validation data set based on the first, second, and third plurality of job information variables 202-214 or predict an amount of temporary memory 132 needed to execute jobs associated with job requests 110 using the trained machine learning model 124. The processor 112 can then either terminate or return to block 402.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system, comprising:
   a first edge database configured to store first job information for a first set of previously performed jobs, the first job information identifying a timestamp, a job name, a job frequency and an amount of memory used for each job of the first set of previously performed jobs;
   a first database processor communicatively coupled to the first edge database and configured to detect any changes to the first job information and, in response, communicate at least a portion of the first job information to a job ingestion processor;
   a second edge database configured to store second job information for a second set of previously performed jobs, the second job information identifying a timestamp, a job name, and an amount of memory used for each job of the second set of previously performed jobs;
   a second database processor communicatively coupled to the second edge database and configured to detect any changes to the second job information and, in response, communicate at least a portion of the second job information to the job ingestion processor;
   a third edge database configured to store third job information for a third set of previously performed jobs, the third job information identifying a timestamp, a job name, and an amount of memory used for each job of the third set of previously performed jobs;
   a third database processor communicatively coupled to the third edge database and configured to detect any changes to the third job information and, in response, communicate at least a portion of the third job information to the job ingestion processor;
   the job ingestion processor communicatively coupled to the first database processor, the second database processor, the third database processor and to a memory that stores a data log, the job ingestion processor configured to:
      receive the at least a portion of the first job information, the at least a portion of the second job information, and the at least a portion of the third job information;
      parse the at least a portion of the first job information into a first plurality of job information variables comprising one or more timestamp values corresponding with the timestamp associated with the first job information, job name values corresponding with the job name associated with the first job information, and amount of memory used values corresponding with the amount of memory associated with the first job information;
      parse the at least a portion of the second job information into a second plurality of job information variables comprising one or more timestamp values corresponding with the timestamp associated with the second job information, job name values corresponding with the job name associated with the second job information, and amount of memory used values corresponding with the amount of memory associated with the second job information;
      parse the at least a portion of the third job information into a third plurality of job information variables comprising one or more of timestamp values corresponding with the timestamp associated with the third job information, job name values corresponding with the job name associated with the third job information, and amount of memory used values corresponding with the amount of memory associated with the third job information; and
      send the first plurality of job information variables, the second plurality of job information variables, and the third plurality of job information variables to a processor associated with a predictive engine-scheduling negotiator, wherein the predictive engine-scheduling negotiator is communicatively coupled to the job ingestion processor;
   the processor associated with the predictive engine-scheduling negotiator is configured to:
      store in the data log the first plurality of job information variables, the second plurality of job information variables, and the third plurality of job information variables;
      train a machine learning algorithm using the first plurality of job information variables, the second plurality of job information variables, and the third plurality of job information variables;
      receive a first job request comprising a first job name and a first job frequency associated with the first job request;
      compare the received first job name and the first job frequency with the job name and the job frequency associated with each of the first set of previously performed jobs, respectively;
      identify one of the first set of previously performed jobs based on the comparison, wherein the job frequency of the identified one of the first set of previously performed jobs matches with the first job frequency;
      determine if a data processing size associated with the identified one of the first set of previously performed jobs exceeds a first predetermined memory size associated with the first job request, wherein the first predetermined memory size is determined by the trained machine learning algorithm;
      in response to determining the data processing size of the identified one of the first set of previously performed jobs exceeds a first predetermined memory size associated with the first job request, cause deallocation of a second amount of temporary memory associated with a first service provider network, wherein the second amount of temporary memory is sufficient to execute the first job request at the first service provider network; and
      transmit the first job request to the first service provider network for execution using the deallocated second amount of temporary memory.

2. The system of claim 1, the processor configured to:
   receive the first plurality of job information variables, the second plurality of job information variables, and the third plurality of job information variables;
   store the first plurality of job information variables, the second plurality of job information variables, and the third plurality of job information variables in the data log.

3. The system of claim 2, wherein the processor is further configured to store a trained machine learning algorithm, the trained machine learning algorithm is trained using the data log and a training data set.

4. The system of claim 2, wherein the processor is further configured to:
   populate a variable space of the machine learning algorithm with the first plurality of job information variables, the second plurality of job information variables, and the third plurality of job information variables; and perform at least one of training the machine learning algorithm and predicting an amount of temporary memory to execute the first job request, wherein the first predetermined memory size is predicted by the trained machine learning algorithm.

5. The system of claim 1, wherein the job ingestion processor is further configured to store the first plurality of job information variables, the second plurality of job information variables, and the third plurality of job information variables in the data log.

6. The system of claim 1, wherein processor is further configured to negotiate with at least one service provider and allocation of system resources based on the data processing size of the identified one of the first set of previously performed jobs.

7. The system of claim 6, wherein the job ingestion processor is further configured to:

select the at least one service provider based on service provider availability.

8. A method, comprising:

storing first job information for a first set of previously performed jobs, the first job information identifying a timestamp, a job name, a job frequency and an amount of memory used for each job of the first set of previously performed jobs;

detecting any changes to the first job information and, in response, communicate at least a portion of the first job information to a job ingestion processor;

storing second job information for a second set of previously performed jobs, the second job information identifying a timestamp, a job name, and an amount of memory used for each job of the second set of previously performed jobs;

detecting any changes to the second job information and, in response, communicate at least a portion of the second job information to the job ingestion processor;

storing third job information for a third set of previously performed jobs, the third job information identifying a timestamp, a job name, and an amount of memory used for each job of the third set of previously performed jobs;

detecting any changes to the third job information and, in response, communicate at least a portion of the third job information to the job ingestion processor;

receiving, by a job ingestion processor, the at least a portion of the first job information, the at least a portion of the second job information, and the at least a portion of the third job information;

parsing, by the job ingestion processor, the at least a portion of the first job information into a first plurality of job information variables comprising one or more timestamp values corresponding with the timestamp associated with the first job information, job name values corresponding with the job name associated with the first job information, and amount of memory used values corresponding with the amount of memory associated with the first job information;

parsing, by the job ingestion processor, the at least a portion of the second job information into a second plurality of job information variables comprising one or more timestamp values corresponding with the timestamp associated with the second job information, job name values corresponding with the job name associated with the second job information, and amount of memory used values corresponding with the amount of memory associated with the second job information;

parsing, by the job ingestion processor, the at least a portion of the third job information into a third plurality of job information variables comprising one or more of timestamp values corresponding with the timestamp associated with the third job information, job name values corresponding with the job name associated with the third job information, and amount of memory used values corresponding with the amount of memory associated with the third job information;

sending, by the job ingestion processor, the first plurality of job information variables, the second plurality of job information variables, and the third plurality of job information variables to a processor associated with a predictive engine-scheduling negotiator, wherein the predictive engine-scheduling negotiator is communicatively coupled to the job ingestion processor;

storing, by the processor, in a data log the first plurality of job information variables, the second plurality of job information variables, and the third plurality of job information variables;

training, by the processor, a machine learning algorithm using the first plurality of job information variables, the second plurality of job information variables, and the third plurality of job information variables;

receiving, by the processor, a first job request comprising a first job name and a first job frequency associated with the first job request;

comparing, by the processor, the received first job name and the first job frequency with the job name and the job frequency associated with each of the first set of previously performed jobs, respectively;

identifying, by the processor, one of the first set of previously performed jobs based on the comparison, wherein the job frequency of the identified one of the first set of previously performed jobs matches with the first job frequency;

determining, by the processor, if a data processing size associated with the identified one of the first set of previously performed jobs exceeds a first predetermined memory size associated with the first job request, wherein the first predetermined memory size is determined by the trained machine learning algorithm;

in response to determining the data processing size of the identified one of the first set of previously performed jobs exceeds a first predetermined memory size associated with the first job request, causing, by the processor, deallocation of a second amount of temporary memory associated with a first service provider network, wherein the second amount of temporary memory is sufficient to execute the first job request at the first service provider network; and transmitting, by the processor, the first job request to the first service provider network for execution using the deallocated second amount of temporary memory.

9. The method of claim 8, further comprising:

receiving the first plurality of job information variables, the second plurality of job information variables, and the third plurality of job information variables at a job ingestion processor; and storing the first plurality of job information variables, the second plurality of job information variables, and the third plurality of job information variables in the data log.

10. The method of claim 9, further comprising storing a trained machine learning algorithm, the trained machine learning algorithm is trained using the data log and a training data set.

11. The method of claim 9, further comprising:
populating a variable space of the machine learning algorithm with the first plurality of job information variables, the second plurality of job information variables, and the third plurality of job information variables; and
performing at least one of training the machine learning algorithm and predicting an amount of temporary memory to execute the first job request, wherein the first predetermined memory size is predicted by the trained machine learning algorithm.

12. The method of claim 8, further comprising storing the first plurality of job information variables, the second plurality of job information variables, and the third plurality of job information variables in the data log.

13. The method of claim 12, further comprising negotiating with at least one service provider and allocation of system resources based on the data processing size of the identified one of the first set of previously performed jobs.

14. The method of claim 13, further comprising:
selecting the at least one service provider based on service provider availability.

15. A non-transitory computer-readable storage medium, the computer-readable storage medium including instructions that when executed by a computer, cause the computer to perform operations of:
storing first job information for a first set of previously performed jobs, the first job information identifying a timestamp, a job name, a job frequency and an amount of memory used for each job of the first set of previously performed jobs;
detecting any changes to the first job information and, in response, communicate at least a portion of the first job information to a job ingestion processor;
storing second job information for a second set of previously performed jobs, the second job information identifying a timestamp, a job name, and an amount of memory used for each job of the second set of previously performed jobs;
detecting any changes to the second job information and, in response, communicate at least a portion of the second job information to the job ingestion processor;
storing third job information for a third set of previously performed jobs, the third job information identifying a timestamp, a job name, and an amount of memory used for each job of the third set of previously performed jobs;
detecting any changes to the third job information and, in response, communicate at least a portion of the third job information to the job ingestion processor;
receiving, by a job ingestion processor, the at least a portion of the first job information, the at least a portion of the second job information, and the at least a portion of the third job information;
parsing, by the job ingestion processor, the at least a portion of the first job information into a first plurality of job information variables comprising one or more timestamp values corresponding with the timestamp associated with the first job information, job name values corresponding with the job name associated with the first job information, and amount of memory used values corresponding with the amount of memory associated with the first job information;
parsing, by the job ingestion processor, the at least a portion of the second job information into a second plurality of job information variables comprising one or more timestamp values corresponding with the timestamp associated with the second job information, job name values corresponding with the job name associated with the second job information, and amount of memory used values corresponding with the amount of memory associated with the second job information;
parsing, by the job ingestion processor, the at least a portion of the third job information into a third plurality of job information variables comprising one or more of timestamp values corresponding with the timestamp associated with the third job information, job name values corresponding with the job name associated with the third job information, and amount of memory used values corresponding with the amount of memory associated with the third job information;
sending, by the job ingestion processor, the first plurality of job information variables, the second plurality of job information variables, and the third plurality of job information variables to a processor associated with a predictive engine-scheduling negotiator, wherein the predictive engine-scheduling negotiator is communicatively coupled to the job ingestion processor;
storing, by the processor, in a data log the first plurality of job information variables, the second plurality of job information variables, and the third plurality of job information variables;
training, by the processor, a machine learning algorithm using the first plurality of job information variables, the second plurality of job information variables, and the third plurality of job information variables;
receiving, by the processor, a first job request comprising a first job name and a first job frequency associated with the first job request;
comparing, by the processor, the received first job name and the first job frequency with the job name and the job frequency associated with each of the first set of previously performed jobs, respectively;
identifying, by the processor, one of the first set of previously performed jobs based on the comparison, wherein the job frequency of the identified one of the first set of previously performed jobs matches with the first job frequency;
determining, by the processor, if a data processing size associated with the identified one of the first set of previously performed jobs exceeds a first predetermined memory size associated with the first job request, wherein the first predetermined memory size is determined by the trained machine learning algorithm;
in response to determining the data processing size of the identified one of the first set of previously performed jobs exceeds a first predetermined memory size associated with the first job request, causing, by the processor, deallocation of a second amount of temporary memory associated with a first service provider network, wherein the second amount of temporary memory is sufficient to execute the first job request at the first service provider network; and
transmitting, by the processor, the first job request to the first service provider network for execution using the deallocated second amount of temporary memory.

16. The non-transitory computer-readable storage medium of claim 15, wherein the instructions cause the computer to perform operations of:

receiving the first plurality of job information variables, the second plurality of job information variables, and the third plurality of job information variables at a job ingestion processor; and storing the first plurality of job information variables, the second plurality of job information variables, and the third plurality of job information variables in the data log.

17. The non-transitory computer-readable storage medium of claim 16, wherein the instructions cause the computer to perform operations of storing a trained machine learning algorithm, the trained machine learning algorithm is trained using the data log and a training data set.

18. The non-transitory computer-readable storage medium of claim 16, wherein the instructions cause the computer to perform operations of:

populating a variable space of the machine learning algorithm with the first plurality of job information variables, the second plurality of job information variables, and the third plurality of job information variables; and performing at least one of training the machine learning algorithm and predicting an amount of temporary memory to execute the first job request, wherein the first predetermined memory size is predicted by the trained machine learning algorithm.

19. The non-transitory computer-readable storage medium of claim 15, wherein the instructions cause the computer to perform operations of storing the first plurality of job information variables, the second plurality of job information variables, and the third plurality of job information variables in the data log.

20. The non-transitory computer-readable storage medium of claim 19, wherein the instructions cause the computer to perform operations of negotiating with at least one service provider and allocation of system resources based on the data processing size of the identified one of the first set of previously performed jobs and selecting the at least one service provider based on service provider availability.

* * * * *